No. 632,679. Patented Sept. 5, 1899.
F. A. FELDKAMP.
ACETYLENE GAS GENERATOR.
(Application filed Nov. 30, 1898.)
(No Model.) 6 Sheets—Sheet 2.

Fig. 2

WITNESSES:

INVENTOR:
Fritz A. Feldkamp,
BY Fred'k Fraentzel,
ATTORNEY

No. 632,679. Patented Sept. 5, 1899.
F. A. FELDKAMP.
ACETYLENE GAS GENERATOR.
(Application filed Nov. 30, 1898.)

(No Model.) 6 Sheets—Sheet 4.

WITNESSES:
Wm. H. Canfield, Jr.
Walter H. Talmage.

INVENTOR:
Fritz A. Feldkamp,
BY
Fred ZC. Fraentzel,
ATTORNEY

No. 632,679. Patented Sept. 5, 1899.
F. A. FELDKAMP.
ACETYLENE GAS GENERATOR.
(Application filed Nov. 30, 1898.)

(No Model.) 6 Sheets—Sheet 5.

WITNESSES:  INVENTOR:
Wm. H. Canfield, Jr.  Fritz A. Feldkamp
Walter H. Talmage.  BY Fred C. Fraentzel,
ATTORNEY No. 632,679. Patented Sept. 5, 1899.
F. A. FELDKAMP.
ACETYLENE GAS GENERATOR.
(Application filed Nov. 30, 1898.)

(No Model.) 6 Sheets—Sheet 6.

Fig. 10

WITNESSES:
Wm. H. Caulfield Jr.
Walter H. Talmage

INVENTOR:
Fritz A. Feldkamp,
BY
Fred C. Fraentzel,
ATTORNEY

UNITED STATES PATENT OFFICE.

FRITZ A. FELDKAMP, OF NEWARK, NEW JERSEY.

ACETYLENE-GAS GENERATOR.

SPECIFICATION forming part of Letters Patent No. 632,679, dated September 5, 1899.

Application filed November 30, 1898. Serial No. 697,818. (No model.)

*To all whom it may concern:*

Be it known that I, FRITZ A. FELDKAMP, a subject of the Emperor of Germany, residing at Newark, in the county of Essex and State of New Jersey, have invented certain new and useful Improvements in Acetylene-Gas Generators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has for its special purpose to provide a novel construction of apparatus for generating acetylene gas in which prepared calcium carbid can be used in the form of lumps to be deposited from time to time in predetermined quantities into the water to generate the gas in proper proportion to the consumption of the gas, the apparatus being of such construction that the carbid or other gas-producing substance which is introduced into the water is entirely dissolved and produces the required volume of gas, according to the consumption.

Many other objects of this invention not here specifically set forth will be more fully described in the accompanying specification.

To this end my invention consists in the general construction of apparatus and in the arrangement of the novel devices and combinations thereof, all of which will be hereinafter fully described and finally defined in the clauses of the claim hereto appended, with a view of providing an apparatus in which granulated calcium carbid is introduced into the water from time to time, being regulated automatically by the amount of consumption of the gas and to provide a perfectly-safe apparatus.

From the following description of the operations of the several parts of the apparatus it will be evident that the gas-cocks of the burners in the piping connected with the apparatus can be rapidly turned off and the apparatus left standing without further care, because there is no continuous generation of acetylene gas, and consequently there is no danger of explosion owing to an overproduction of gas.

The invention is clearly illustrated in the accompanying drawings, in which—

Similar letters of reference are employed in all of the above-described views to indicate corresponding parts.

Figure 3:
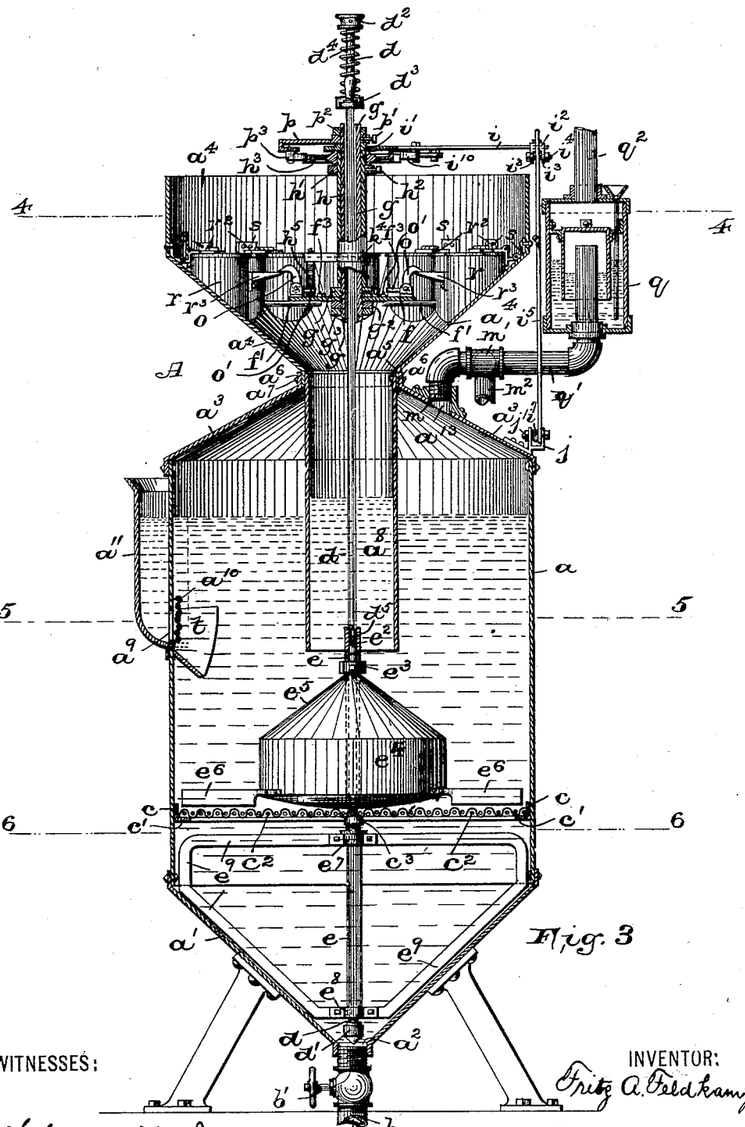
Fig. 3 is a longitudinal vertical section of the apparatus illustrating the inner construction and arrangement of the several devices and parts that go to make up the present construction of apparatus, said section being taken on line $x$ in Fig. 2.
Figure 4:
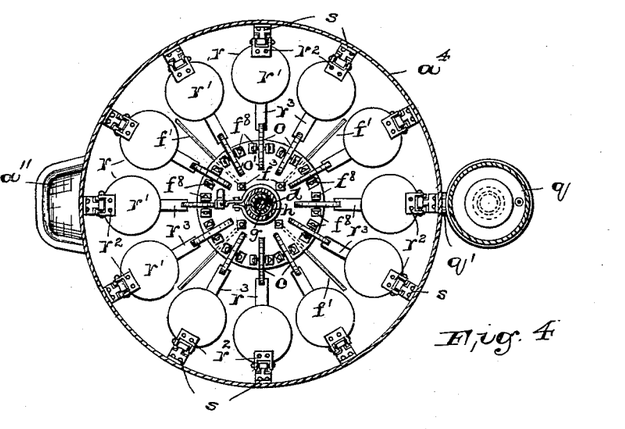
Figs. 4, 5, and 6 are horizontal sections of the apparatus, taken, respectively, on lines 4 4, 5 5, and 6 6 in said Fig. 3.
Figure 5:
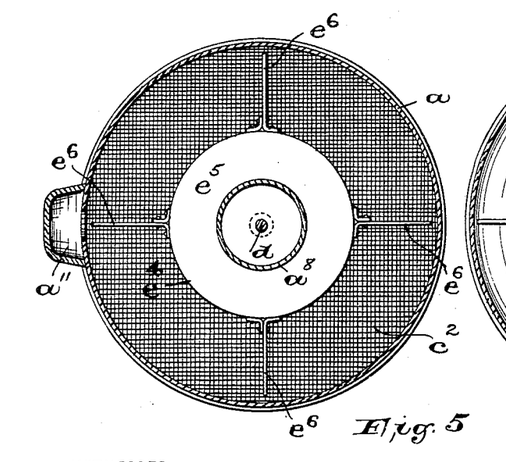
Figure 6:
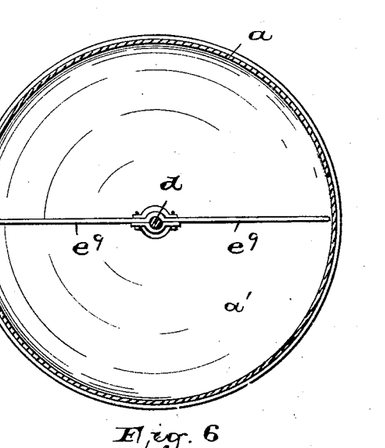

Referring to the said drawings, A indicates a suitable tank, consisting, essentially, of a body $a$, and a conical bottom $a'$, having a suitable opening $a^2$, in which is secured in any desirable manner an outlet-pipe $b$, provided with a shut-off cock or valve $b'$, substantially as illustrated in the several figures of the drawings. The said tank is also provided with an upwardly-sloping or cone-shaped top $a^3$, forming a cover for the body $a$, and $a^4$ indicates a funnel-shaped top piece, which is provided at its smaller end with an annular flange $a^5$, surrounding the discharge-opening of said top piece $a^4$, said flange $a^5$ being fitted in the neck formed by an annular flange $a^6$ of the cone-shaped top $a^3$, substantially as illustrated. Said parts are suitably secured together by means of rivets $a^7$ or in any other well-known manner, and held in position by the same rivets, as will be seen from Fig. 3, is a hollow cylinder $a^8$, the lower end of which projects beneath the surface of the water in the tank A. In one side of the portion or body $a$ is an inlet-opening $a^9$, preferably covered by a suitable screen $a^{10}$, and on the outer side of said body is a suitable filling device, as $a^{11}$, into which water can be admitted when it is intended to fill the tank A from time to time with a fresh supply of water.

At a suitable point near the lower portion of the body $a$ of the tank A is an annular ring $c$, provided with a suitable shoulder $c'$, and arranged upon this shoulder $c'$ is a suitable screen $c^2$, for the purposes hereinafter set forth. Said screen $c^2$ is provided with a centrally-arranged bearing $c^3$, in which is rotatably arranged a rod or stem $d$. Said rod or stem is provided at the bottom with a cone-shaped or other suitable end, as $d'$, which can be forced down into the pipe $b$ and valve $b'$ to force any deposited lime or other obstruction that may have become lodged in said parts from the end of said pipe, and thereby permit a free passage-way for the outflowing water. Said rod or stem $d$ is provided at the top with a push-piece $d^2$ and a crank $d^3$ for turning the same, a spring $d^4$ being placed on that portion of the rod between said push-piece $d^2$ and the crank $d^3$, as shown. Said spring is for the purpose of returning the rod or stem $d$ to its initial position after it has been pushed down by the operator for forcing the piercing means $d'$ on said rod or stem down into the pipe $b$ and its valve $b'$, as will be clearly understood. Upon the lower portion of said rod $d$ is a tube or pipe $e$, which is operatively connected with the rod or stem $d$ by means of a pin $e^2$, secured in said tube or pipe $e$, and being slidably arranged in a slot $d^5$ in the said rod or stem $d$. Secured upon said tube or pipe $e$, by means of a collar $e^3$ or in any other well-known manner, is a deflecting device $e^4$, which is preferably provided with a cone-shaped top $e^5$ and has radially-arranged wings $e^6$, which extend to points near the inner surface of the body $a$ and can be rotated directly above the upper surface of the screen $c^2$ to scatter or crush the larger particles of the calcium carbid or other gas-producing substance that may accumulate upon the said screen. Connected with said tube or pipe $e$, by means of the bearing-plates $e^7$ and $e^8$ or in any other well-known manner, is a frame $e^9$, which is made to conform in its general outline to the inner contour of the lower part of the tank A and can be used as a scraper to remove any impurities, such as deposited lime, from the inner surface of the lower part of the tank A when said rod $d$ is turned by means of its crank $d^3$, hereinabove mentioned. Thus it will be seen that while the parts $e^4$, $e^6$, and $e^9$ are permanently fixed in position on the tube or pipe $e$ they are also operatively connected with the rod or stem $d$, and still the latter is capable of a reciprocatory sliding motion in said tube or pipe $e$ when depressed to permit the entering of the part $d'$ into the pipe $b$, as will be clearly evident from an inspection of Fig. 3. As will be seen from Figs. 3, 4, 8, and 9, I have arranged upon the upper portion of the said rod or stem $d$ a short tube or pipe $g$, which is provided at its lower end with a screw-threaded part, whereby it can be screwed in position on a disk or plate $f$, suitable lock-nuts $g'$, $g^2$, and $g^3$ being also screwed upon said end of the tube or pipe $g$ and arranged on opposite sides of the said disk $f$ to more securely connect said tube and disk together. Said disk $f$ is provided with several holes, in which I have arranged and secured by means of nuts $f^3$ the ends $f^2$ of certain stay bolts or rods $f'$, the opposite ends $f^4$ of said rods being passed through holes $a^{12}$ in the sides of the top piece $a^4$ and being secured in position by means of a washer $f^5$ and the nuts $f^6$ and $f^7$, as illustrated more especially in Fig. 9 of the drawings. Said stay-rods $f'$ will thus firmly hold the said disk or plate $f$ in its proper position, as will be clearly evident. Rotatively arranged upon the said tube or pipe $g$ is a second tube or pipe $h$, which has its lower end resting lightly upon the said nut $g'$, hereinabove mentioned. At or near the upper end of this tube or pipe $h$ is a collar $h'$, secured to said tube or pipe by means of a set-screw $h^2$, and $h^3$ is a suitable ratchet-wheel, which is also suitably secured to the said tube or pipe $h$ and in position directly above the said collar $h'$. Loosely and rotatively arranged on the end of the tube or pipe $g$, which extends above the said tube or pipe $h$, as shown, is the perforated end $i'$ of a rod or arm $i$, said arm being provided at its free end with a bracket $i^2$, having a pair of perforated ears or lugs $i^3$, and a pin $i^4$, secured in said ears or lugs. Connected with said pin $i^4$ is the slotted end $i^6$ of a downwardly-extending connecting-rod $i^5$, which is secured at its lower end to a cross bar or rod $i^7$. Said rod $i^7$ is fulcrumed upon a pin $j'$ in a bracket $j$, which in turn is secured upon the said top piece $a^3$ of the tank A in the proper place, as will be clearly seen from an inspection of Figs. 1, 2, and 3. Said rod $i^7$ has a suitable weight or counterbalance $i^8$ at its one end and has its opposite end $i^9$ movably and operatively arranged between a pair of rollers $k'$ in a frame $k$, which is secured to the side of the usual form of gas-holder $l'$.

L indicates a gas-receiver comprising a suitable water-tank $l$, which is open at the top and is provided with any desirable number of uprights $l^2$. The said gas-holder, which is movably arranged between these uprights, is open at the bottom and is closed at the top. The open part of said holder $l'$ is arranged in the water in the tank $l$, and upon the top of said holder are a number of grooved wheels $l^3$, which are in rolling contact with the uprights $l^2$ to properly guide the vertical movement of the gas-holder as it moves up and down by the admission or emission of gas into or from the said holder.

Connected with an outlet $a^{13}$ in the cone-shaped top $a^3$ of the tank A is a pipe $m$, having a T-fitting $m'$. Connected with said fitting $m'$ is a downwardly-extending pipe $m^2$, which leads into the tank or reservoir $l$ at or near the bottom thereof, and terminates in an upright pipe $m^3$, leading to a point above the water in the gas-holder $l'$. Said pipe $m^2$ is provided with a stop-cock $m^4$ for shutting off the communication between the tank A and the receiver $l$ in case of repair or for other reasons, and connected with a T-fitting $m^5$ in the said pipe may be a drip-pot $m^6$ for catching any water caused by condensation, said pot being provided with an outlet-cock $m^7$ for drawing off the water when necessary. Leading from a point at or near the bottom of said water-tank $l$ is a pipe $n$, in which may be arranged the burner or burners for consuming the gas. Said pipe $n$ is provided within the gas-holder $l'$ with an upright pipe $n'$, extending above the water therein, the gas in said holder passing into said pipe $n'$ and then through the main pipe $n$ to the burner or burners. Connected with the said T-fitting $m'$, herein-above mentioned, is a pipe $q'$, which leads into the bottom of the usual form of gas-trap $q$, arranged in an escape-pipe $q^2$, that leads to the roof of the building. Thus it will be seen that an oversupply of gas produced in the tank A will pass through the pipe $q'$ into the said trap $q$, and thence through the escape-pipe $q^2$ into the open air, thereby overcoming all danger of explosion.

Figure 1:
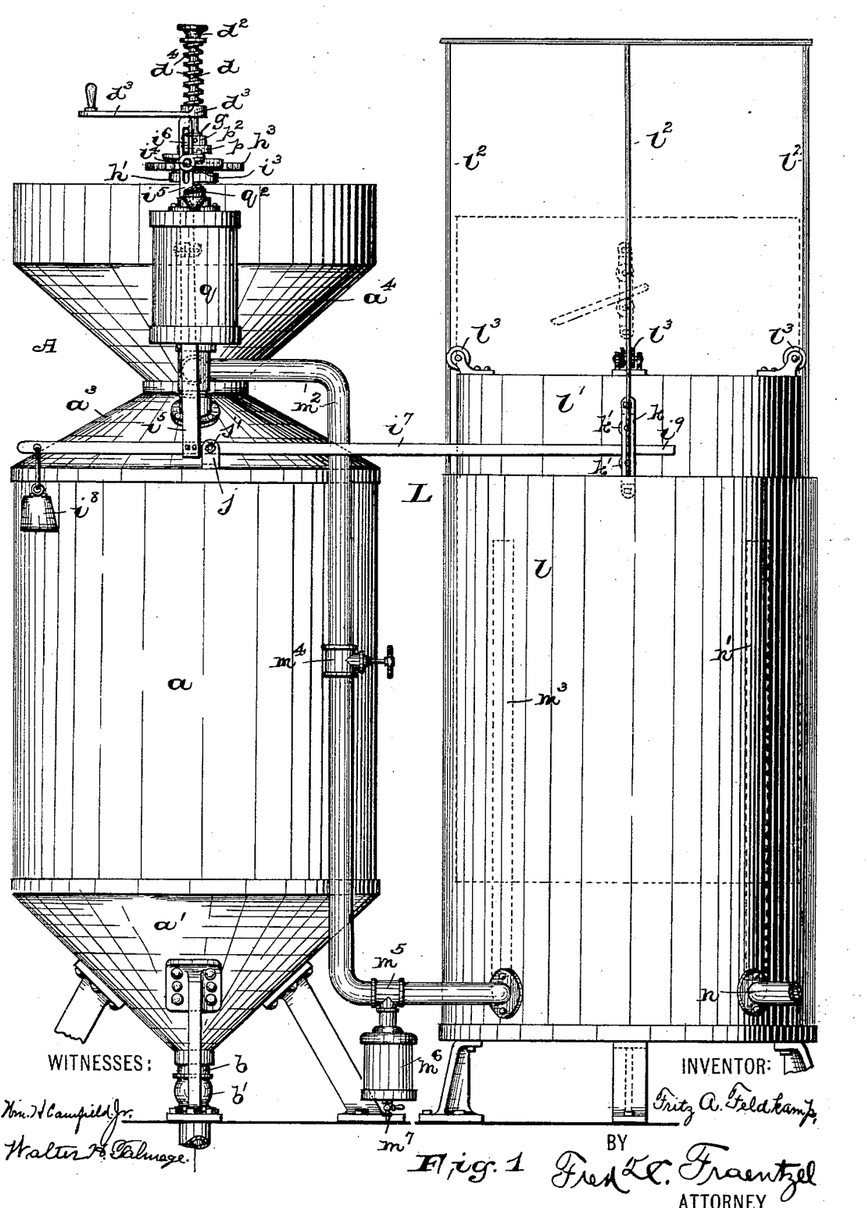
Figure 1 is a side elevation of the apparatus embodying the principles of my present invention.
Figure 2:
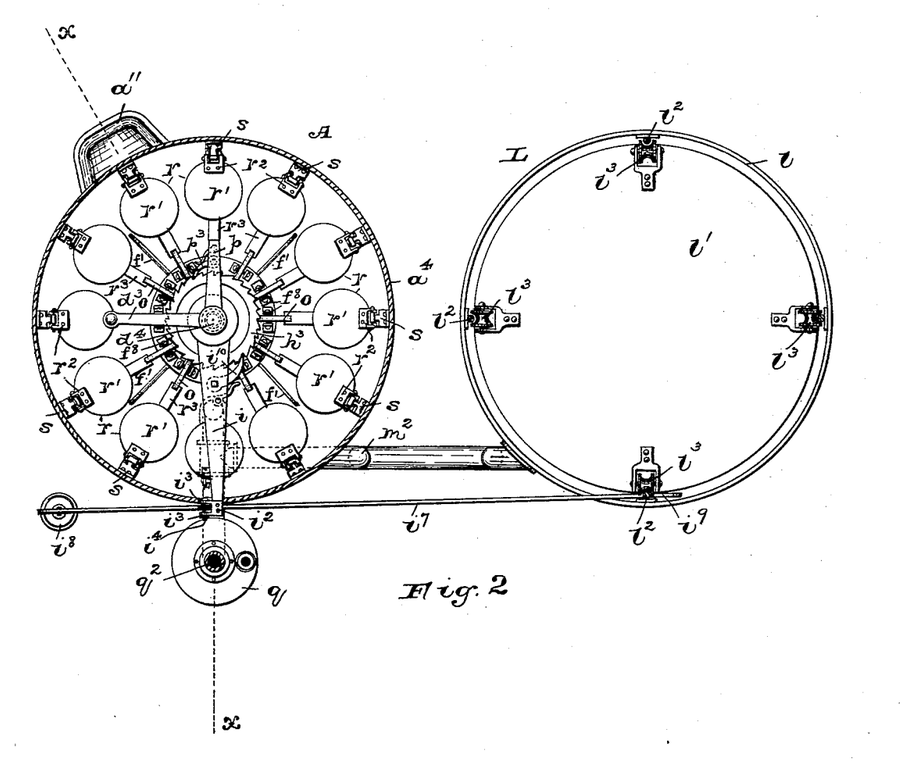
Fig. 2 is a top view of the same.

When the gas-holder $l'$ of the receiver L has been raised by the gas, the rod $i^7$ will stand approximately in the position indicated in dotted outline in Fig. 1. Now as the gas is being withdrawn by consumption at the burner or burners the device $k$ will actuate said rod $i^7$, and in turn also the connecting-rod $i^5$. The movement of the rod $i^5$ will cause a horizontal motion of the rod or arm $i$, and the latter being provided with a spring-actuated pawl or dog $i^{10}$, which is in operative engagement with the ratchet-teeth of the ratchet-wheel $h^3$, will cause an intermittent rotary motion of the tube or pipe $h$ upon the said tube or pipe $g$ and will bring a spur or foot $h^5$, connected with a clamping-band $h^4$, which is secured upon said tube or pipe $h$, in operative engagement with a finger $o'$ of an arm or post $o$, which is pivotally arranged in a bearing $f^8$ on the disk or plate $f$, as clearly represented in Fig. 8 of the drawings. Arranged concentric with the said disk or plate $f$ on the inner conical surface of the top piece $a^4$ are any desirable number of hinged and spring-actuated carbid-holding receptacles $r$, and of course the number of bearings $f^8$ on the stationary disk $f$ and the number of posts or arms $o$ in said bearings will correspond to the number of such carbid-holding receptacles $r$.

Figure 7:
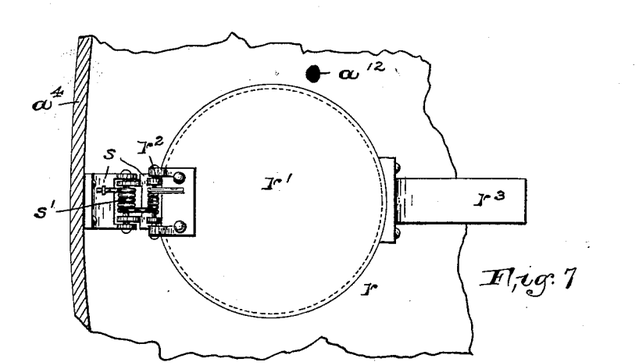
Figs. 7, 8, and 9 are detail views, on an enlarged scale, of certain of the parts illustrated more particularly in Figs. 3 and 4.
Figures 8, 9:
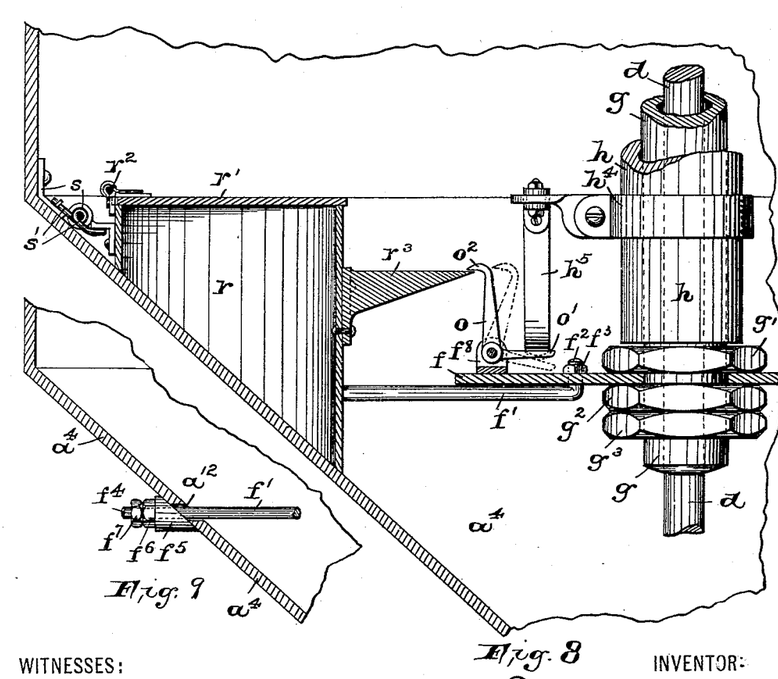

Each receptacle $r$ has a hinged cover $r'$, which can be raised by the operator for filling the receptacle with the carbid, the inclined surface of the top piece $a^4$ of the tank A forming the bottom of each receptacle $r$. Said covers $r'$, as will be seen from Figs. 7 and 8, may be provided with spring-actuated hinges $r^2$, which hold said covers $r'$ down upon the receptacles, as will be evident. Each receptacle $r$ is also secured to the inner surface of the top piece $a^4$ by means of a hinge $s$, each hinge being provided with a suitably-constructed spring $s'$, the normal tendency of which is to cause the receptacle $r$ to be thrown upwardly and backwardly in the manner to be hereinafter set forth in detail, and whereby the open bottom of each receptacle $r$ can be held away from the inclined surface of the top piece $a^4$. In order that each receptacle $r$ may be held in the positions indicated in the several figures of the drawings, and more especially as illustrated in Fig. 8, each receptacle is provided with an arm $r^3$, with the forward end of which can be brought in holding or locked engagement a hook-shaped end or nosing $o^2$ of each post or arm $o$. In this manner each receptacle can be held in its closed position, and is thereby adapted to receive a predetermined quantity of carbid or other gas-producing substance.

After all the receptacles $r$ have been filled with the carbid or other gas-producing substance, as stated, the operator by hand causes one of the receptacles $r$ to deposit its contents into the water in the body $a$ of the tank A. Immediately acetylene gas is generated and the same passes into the gas-receiver L, causing the gas-holder $l'$ to rise. This upward movement of the holder $l'$ brings the rod $i^7$ into the position indicated in the dotted outline in Fig. 1, the intermediate rods or arms connected therewith being simultaneously actuated and the dog or pawl $i^{10}$ having passed over the proper number of ratchet-teeth of the wheel $h^3$. In order that the said ratchet-wheel $h^3$ may be retained in its proper position during the action of these several parts of the mechanism and to prevent any backward movement of said ratchet-wheel on the tube or pipe $h$, I have secured on the end of the tube or pipe $g$, preferably by means of a set-screw $p'$ and a nut $p^2$, (see Fig. 3,) an arm $p$, which has a spring-actuated dog or pawl $p^3$ in operative engagement with the ratchet-teeth of the said wheel $h^3$ and the action of which will be clearly understood from an inspection of Figs. 2 and 3. As soon as the said gas-holder $l'$ is lowered, owing to the consumption of the gas, then the ratchet-wheel $h^3$ will receive a partial rotary motion, whereby the spur or foot $h^5$ will be brought in operative sliding engagement with the finger $o'$ on the next pivotal post $o$ to disengage the nosing of said post from its holding engagement with the arm $r^3$ of the next adjacent receptacle $r$. The spring $s'$, connected with the hinge of said receptacle $r$, will immediately cause said receptacle to be thrown back, and the carbid or other gas-producing substance therein will pass down the inclined surface of the top piece $a^4$, into and through the cylinder $a^8$, down upon the conical device or deflector $e^4$, and will finally be deposited upon the grating or screen $c^2$, where the lumps of carbid are dissolved and generate the acetylene gas. The carbid which I prefer to use is prepared in such a manner that it will not begin to generate the gas upon its immediate contact with the water, and hence there will be no gas formed until the carbid has safely been deposited upon the screen. From an inspection of Fig. 3 of the drawings it will be seen that the inner construction of the tank A and its parts is such that the bubbles of gas that will rise will pass through the water on the outer side of the inner cylinder $a^3$ and into the top of the body $a$ beneath the top piece $a^4$, where the gas is collected. Thus the tank A may be safely provided with an open top piece $a^4$ and without the least danger of any gas escaping into the room.

During the operation of the alternate rising and lowering of the gas-holder $l'$ the mechanism for actuating the receptacles $r$ is intermittently actuated, and from time to time each receptacle $r$ is emptied of its contents, whereby the proper quantity of carbid or other gas-producing substance is deposited in the water in the body $a$ to generate gas in sufficient volume and in proper proportion to the consumption of the gas at the burner or burners in the pipe $n$.

The screen $a^{10}$ over the opening $a^9$ in the side of the body $a$ is for the purpose of preventing any of the lumps or pieces of carbid or other gas-producing substance when dropped upon the conical surface of the deflector $e^4$ from being forced up and through the said opening $a^9$ into the filling device $a^{11}$ on the outer surface of the body $a$ of the tank A. A shield $t$, having an upwardly-inclined surface substantially as illustrated in Fig. 3, is preferably secured to the inner surface of the body $a$ directly beneath and partly around the said opening $a^9$, whereby any lumps or pieces of carbid that may accidentally land on said shield will immediately drop back into the water, and, furthermore, said shield will cause the bubbles of gas generated to pass to either side of the opening $a^9$, and hence the shield serves to prevent the gas from escaping into and passing out of the said opening $a^9$ into the open air.

Figure 10:
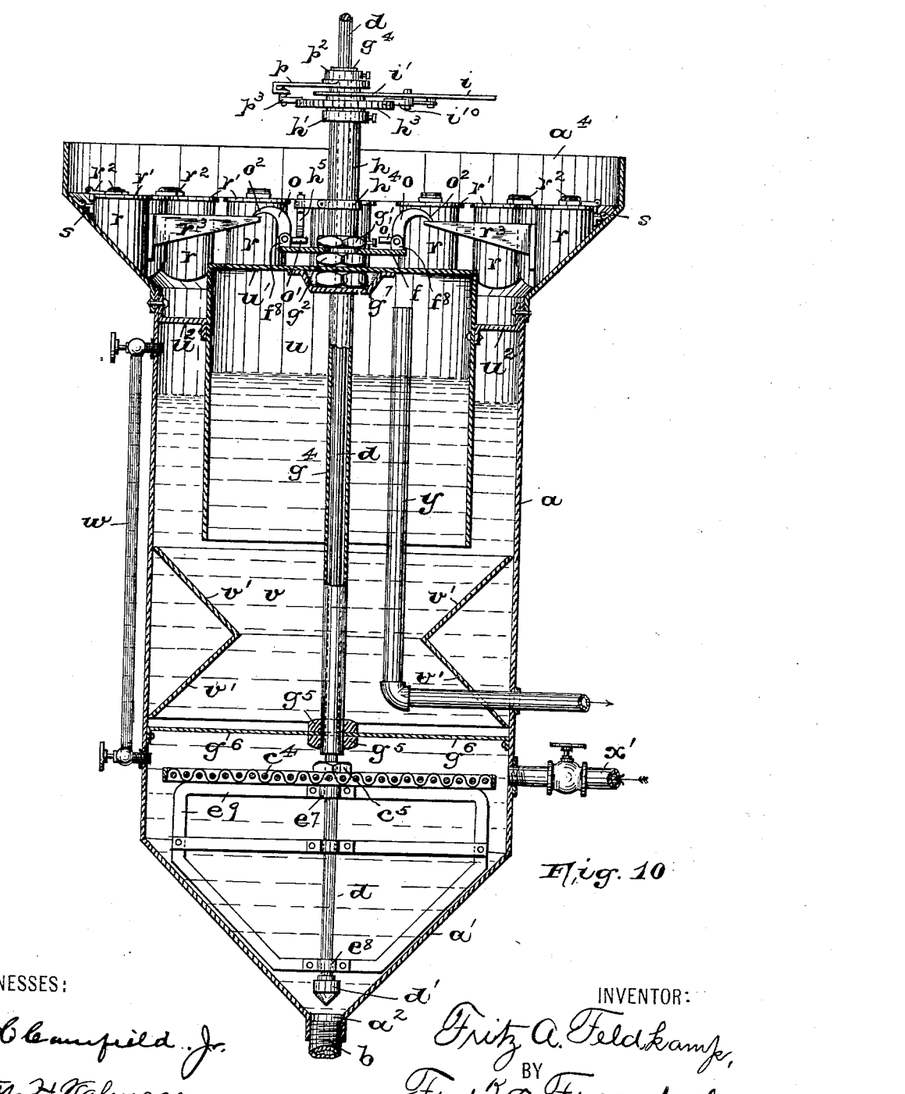
Fig. 10 is a sectional view, similar to that represented in Fig. 3, of an apparatus of a slightly-modified form of construction, but still embodying the principal features of this invention.

In lieu of the construction of acetylene-gas generator just described the apparatus may be made as indicated in Fig. 10. In this construction I dispense with the cone-shaped top $a^3$ to the body $a$ of the tank A, as shown in Figs. 1 and 3 of the drawings, and I secure the top piece $a^4$ directly upon the surrounding edge of the said body $a$, as illustrated in said Fig. 10. The arrangement of the carbid-receptacles $r$ and the means for actuating the same are similar to that described in connection with Figs. 1, 2, et sequitur. In place of a short tube or pipe $g$ on the stem or rod $d$ I employ a long tube or pipe $g^4$, which is held in place at the bottom by means of a pair of nuts $g^5$ and a narrow brace $g^6$, secured to the inner sides of the body $a$, substantially as illustrated. The rod or stem $d$ extends from the bottom of said tube or pipe $g^4$ and is provided with the frame $e^9$, as shown; but in the present construction in place of the screen $c^2$ I employ a screen $c^4$, which is secured to said stem or rod $d$ by means of a nut $c^5$ and can be made to rotate with said stem or rod $d$ to scatter the pieces of carbid, as will be clearly evident from an inspection of said Fig. 10. Held in the proper position on the pipe or tube $g^4$ and supported above the nut $g^7$ on said tube is a gas-holder $u$. This holder has a closed top $u'$ and is secured within the body $a$ of the tank A by means of suitable braces $u^2$. Directly beneath said gas-holder $u$ is a device $v$, which is provided with the inwardly and then outwardly inclining sides $v'$, whereby said device $v$ forms a suitable conveyer for conducting the carbid or other gas-producing substances from the receptacles $r$ down between the annular space formed by the inner surface of the body $a$ and the outer surface of the gas-holder $u$ and then into said conveyer $v$, which conducts the lumps or pieces of carbid or the like directly upon and near the center of the screen $c^4$, as will be understood. In this form of apparatus I may employ the ordinary glass indicator $w$ for indicating the height of the water in the body $a$. $x'$ is an inlet-pipe for admitting water into the tank, and $y$ is the gas-pipe for conducting the gas from the gas-holder $u$ to the gas-receiver L, illustrated in connection with Figs. 1 and 2. The operations of the several parts of the apparatus illustrated in said Fig. 10 will be more clearly understood from an inspection of said Fig. 10, and need not be further described.

From the above description it will be evident that I have devised a simple and operative apparatus for generating acetylene or other gas in the proper proportions to the consumption of the gas, and the consequent danger of explosion, due to an over supply of the gas, is entirely obviated.

I am fully aware that many changes may be made in the arrangements and combinations of the parts and in the several operating mechanisms, as well as in the details of the construction thereof, without departing from the scope of my invention. Hence I do not limit my invention to the exact arrangements and combinations of parts nor to the details of the construction thereof, as herein described and as illustrated in the drawings.

Having thus described my invention, what I claim is—

1. An apparatus for generating acetylene or other gas, comprising a body constructed to contain water, a top piece on said body, a central means of communication between said parts, a centrally-arranged disk in position above said central means of communication, a series of receptacles each adapted to contain a gas-producing substance arranged in said top piece in a horizontal plane and concentric with said central means of communication and said receptacles capable of being raised and depositing their contents, one at a time, into the water, substantially as and for the purpose set forth.

2. An apparatus for generating acetylene or other gas, comprising a body constructed to contain water, a top piece on said body having a funnel-shaped bottom, a central means of communication between said parts, a centrally-arranged disk in position above said central means of communication, a series of pivoted receptacles, each adapted to contain a gas-producing substance arranged in said top piece in a horizontal plane and concentric with said central means of communication, a locking or holding means for normally retaining each receptacle in closed relation with the bottom of said top piece, and a separate means for actuating said locking or holding means and thereby releasing said receptacles in succession to admit a certain quantity of the gas-producing substance, from time to time, into the water, substantially as and for the purposes set forth.

3. An apparatus for generating acetylene or other gas, comprising a body constructed to contain water, a top piece on said body, a hollow cylinder connected with said body and top piece at the junction thereof, to form a central means of communication between said parts, a deflector in said body and beneath the discharge-opening in said cylinder, a centrally-arranged disk in position above said central means of communication, and a series of receptacles on said top piece, each adapted to contain a gas-producing substance, said receptacles being arranged in said top piece in a horizontal plane and concentric with said central means of communication and capable of emptying their contents, one at a time, into the water, substantially as and for the purposes set forth.

4. An apparatus for generating acetylene or other gas, comprising a body constructed to contain water, a top piece on said body, a hollow cylinder connected with said body and top piece at the junction thereof, to form a central means of communication between said parts, a deflector in said body and beneath the discharge-opening in said cylinder, a centrally-arranged disk in position above said central means of communication, and a series of pivoted receptacles, each adapted to contain a gas-producing substance, a locking or holding means for normally retaining each receptacle in closed relation with the bottom of said top piece, and a separate means for actuating said locking or holding means and thereby releasing said receptacles in succession to admit a certain quantity of the gas-producing substance, from time to time, into the water, substantially as and for the purposes set forth.

5. An apparatus for generating acetylene or other gas, comprising a body constructed to contain water, a top piece on said body, a central means of communication between said parts, a centrally-arranged disk in position above said central means of communication, a screen in said body, a series of receptacles, each adapted to contain a gas-producing substance, said receptacles being arranged in said top piece in a horizontal plane and concentric with said central means of communication and capable of emptying their contents, one at a time, into the water and upon said screen, means in said body for spreading the gas-producing substance, when on said screen, and mechanism for rotating said spreading means, substantially as and for the purposes set forth.

6. An apparatus for generating acetylene or other gas, comprising a body constructed to contain water, a top piece on said body, a means of communication between said parts, a screen in said body, a series of receptacles, each adapted to contain a gas-producing substance, said receptacles being arranged and capable of emptying their contents, one at a time, into the water and upon said screen, and means in said body for spreading the gas-producing substance, when on said screen, consisting, essentially, of a deflector $e^4$ having a conical top and radially-arranged wings, and means for rotating said deflector, substantially as and for the purposes set forth.

7. An apparatus for generating acetylene or other gas, comprising a body constructed to contain water, a top piece on said body, a hollow cylinder connected with said body and top piece at the junction thereof, a screen in said body, a deflector on said screen and below the discharge-opening in said cylinder, and a series of pivoted receptacles, each adapted to contain a gas-producing substance, a locking or holding means for normally retaining each receptacle in closed relation with the bottom of said top piece, and a separate means for actuating said locking or holding means and thereby releasing said receptacles in succession to admit a certain quantity of the gas-producing substance, from time to time, into the water, substantially as and for the purposes set forth.

8. An apparatus for generating acetylene or other gas, comprising a body constructed to contain water, a top piece on said body, a hollow cylinder connected with said body and top piece at the junction thereof, a screen in said body, a deflector on said screen and below the discharge-opening in said cylinder, and a series of pivoted receptacles, each adapted to contain a gas-producing substance, a locking or holding means for normally retaining each receptacle in closed relation with the bottom of said top piece, and a separate means for actuating said locking or holding means and thereby releasing said receptacles in succession to admit a certain quantity of the gas-producing substance, from time to time, into the water, and means connected with said deflector for spreading the gas-producing substance on said screen, substantially as and for the purposes set forth.

9. In an apparatus for generating acetylene or other gas, the combination, with a tank comprising a body constructed to contain water, a top piece on said body, a means of communication between said parts, a centrally-arranged rod or stem, a disk on said rod or stem, a series of receptacles on said top piece, each adapted to contain a gas-producing substance, and means on said disk arranged to engage with said receptacles, one at a time, to empty their contents into the water, substantially as and for the purposes set forth.

10. In an apparatus for generating acetylene or other gas, the combination, with a tank comprising a body constructed to contain water, a top piece on said body, a means of communication between said parts, a centrally-arranged rod or stem, a disk on said rod or stem, a series of receptacles on said top piece, each adapted to contain a gas-producing substance, and means on said disk arranged to engage with said receptacles, one at a time, to empty their contents into the water, consisting of a tube or pipe on said rod or stem to which said disk is attached, a spur or foot connected with said tube or pipe, and a series of pivoted posts or arms on said disk normally in holding engagement with said receptacles, substantially as and for the purposes set forth.

11. In an apparatus for generating acetylene or other gas, the combination, with a tank comprising a body constructed to contain water, a top piece on said body, a means of communication between said parts, a centrally-arranged rod or stem, a disk on said rod or stem, a tube or pipe $g$ on said rod or stem to which said disk is secured, a series of receptacles on said top piece, each adapted to contain a gas-producing substance, and means on said disk arranged to engage with said receptacles, one at a time, to empty their contents into the water, substantially as and for the purposes set forth.

12. In an apparatus for generating acetylene or other gas, the combination, with a tank comprising a body constructed to contain water, a top piece on said body, a means of communication between said parts, a centrally-arranged rod or stem, a disk on said rod or stem, a tube or pipe $g$ on said rod or stem to which said disk is secured, a series of receptacles on said top piece, each adapted to contain a gas-producing substance, and means on said disk arranged to engage with said receptacles, one at a time, to empty their contents into the water, consisting, of a tube or pipe $h$ rotatively arranged on said tube or pipe $g$, a ratchet mechanism on said tube or pipe $h$ for actuating the same, a spur or foot connected with said tube or pipe, and a series of pivoted posts or arms on said disk normally in holding engagement with said receptacles, substantially as and for the purposes set forth.

13. In an apparatus for generating acetylene or other gas, a tank constructed to contain water and means for feeding carbid or other gas-producing substances into said tank, an outlet-pipe in said tank, a stem or rod in said tank, and means at the bottom of said rod or stem to be forced into said outlet-pipe to remove any obstructions in said pipe, substantially as and for the purposes set forth.

14. In an apparatus for generating acetylene or other gas, a tank constructed to contain water and means for feeding carbid or other gas-producing substances into said tank, an outlet-pipe in said tank, a stem or rod in said tank, a deflecting device on said rod, said tank being provided with an inlet-opening in the side thereof, a screen over said opening, a shield directly beneath said opening, a screen $c^2$ in said tank, a scraper connected with the lower end of said stem or rod, and means for rotating said stem or rod, substantially as and for the purposes set forth.

15. In an apparatus for generating acetylene or other gas, the combination, with a water-tank comprising a body, a top piece on said body, and means of communication between said parts, of a series of pivoted receptacles on said top piece, each adapted to contain a gas-producing substance, a locking or holding means for normally retaining each receptacle in closed relation with the bottom of said top piece, a separate means for actuating said locking or holding means and releasing said receptacles in succession to admit a certain quantity of the gas-producing substance, from time to time, into the water, a gas-receiver connected with said water-tank, a vertically-moving gas-holder in said gas-receiver, and an intermediate mechanism between said gas-holder and said locking or holding means for actuating said receptacles containing the said gas-producing substances, said mechanism being actuated by the rising and falling of said gas-holder, substantially as and for the purposes set forth.

16. In an apparatus for generating acetylene or other gas, the combination, with a water-tank comprising a body, a top piece on said body, and means of communication between said parts, of a series of pivoted receptacles on said top piece, each adapted to contain a gas-producing substance, a locking or holding means for normally retaining each receptacle in closed relation with the bottom of said top piece, a separate means for actuating said locking or holding means and releasing said receptacles in succession to admit a certain quantity of the gas-producing substance, from time to time, into the water, a gas-receiver connected with said water-tank, a vertically-moving gas-holder in said gas-receiver, and an intermediate mechanism between said gas-holder and said locking or holding means for actuating said receptacles containing the said gas-producing substances, said mechanism being actuated by the rising and falling of said gas-holder, and consisting, essentially, of a ratchet mechanism, and a series of pivotally-connected arms or levers, all arranged, substantially as and for the purposes set forth.

17. In an apparatus for generating acetylene or other gas, the combination, with a tank comprising a body constructed to contain water, a top piece on said body, and a means of communication between said parts, of a centrally-arranged rod or stem, a disk on said rod or stem, a series of receptacles on said top piece, each adapted to contain a gas-producing substance, a locking or holding means on said disk arranged to engage with said receptacles, one at a time, to empty their contents into the water, a gas-receiver connected with said water-tank, a vertically-moving gas-holder in said gas-receiver, and an intermediate mechanism between said gas-holder and said locking or holding means connected with said disk, actuated by the rising and falling of said gas-holder, substantially as and for the purposes set forth.

18. In an apparatus for generating acetylene or other gas, the combination, with a tank comprising a body constructed to contain water, a top piece on said body, and a means of communication between said parts, of a centrally-arranged rod or stem, a disk on said rod or stem, a series of receptacles on said top piece, each adapted to contain a gas-producing substance, a locking or holding means on said disk arranged to engage with said receptacles, one at a time, to empty their contents into the water, a gas-receiver connected with said water-tank, a vertically-moving gas-holder in said gas-receiver, and an intermediate mechanism between said gas-holder and said locking or holding means connected with said disk, actuated by the rising and falling of said gas-holder, said means consisting, essentially, of a ratchet mechanism, and a series of pivotally-connected arms or levers, all arranged, substantially as and for the purposes set forth.

19. In an apparatus for generating acetylene or other gas, the combination, with a tank comprising a body constructed to contain water, a top piece on said body, and a means of communication between said parts, of a centrally-arranged rod or stem, a disk on said rod or stem, a series of receptacles on said top piece, each adapted to contain a gas-producing substance, a locking or holding means on said disk arranged to engage with said receptacles, one at a time, to empty their contents into the water, consisting of a tube or pipe on said rod or stem to which said disk is attached, a spur or foot connected with said tube or pipe, and a series of posts or arms on said disk normally in holding engagement with said receptacles, a gas-receiver connected with said water-tank, a vertically-moving gas-holder in said gas-receiver, and an intermediate mechanism between said gas-holder and said locking or holding means connected with said disk, actuated by the rising and falling of said gas-holder, substantially as and for the purposes set forth.

20. In an apparatus for generating acetylene or other gas, the combination, with a tank comprising a body constructed to contain water, a top piece on said body, and a means of communication between said parts, of a centrally-arranged rod or stem, a disk on said rod or stem, a series of receptacles on said top piece, each adapted to contain a gas-producing substance, a locking or holding means on said disk arranged to engage with said receptacles, one at a time, to empty their contents into the water, consisting of a tube or pipe on said rod or stem to which said disk is attached, a spur or foot connected with said tube or pipe, and a series of posts or arms on said disk normally in holding engagement with said receptacles, a gas-receiver connected with said water-tank, a vertically-moving gas-holder in said gas-receiver, and an intermediate mechanism between said gas-holder and said locking or holding means connected with said disk, actuated by the rising and falling of said gas-holder, consisting, essentially, of a ratchet mechanism, and a series of pivotally-connected arms or levers, all arranged, substantially as and for the purposes set forth.

21. In an apparatus for generating acetylene or other gas, the combination, with a water-tank comprising a body, a top piece on said body, and a means of communication between said parts, of a centrally-arranged rod or stem, a disk on said rod or stem, a tube or pipe $g$ on said rod or stem to which said disk is secured, a series of receptacles on said top piece, each adapted to contain a gas-producing substance, a locking or holding means on said disk arranged to engage with said receptacles, one at a time, to empty their contents into the water-tank, consisting, of a tube $h$ rotatively arranged on said tube or pipe $g$, a ratchet mechanism on said tube or pipe $h$ for actuating the same, a spur or foot connected with said tube or pipe, and a series of pivoted posts or arms on said disk normally in holding engagement with said receptacles, a gas-receiver connected with said water-tank, a vertically-moving gas-holder in said gas-receiver, and an intermediate mechanism between said gas-holder and said ratchet mechanism, actuated by the rising and falling of said gas-holder, substantially as and for the purposes set forth.

22. In an apparatus for generating acetylene or other gas, the combination, with a water-tank comprising a body, a top piece on said body, and a means of communication between said parts, of a centrally-arranged rod or stem, a disk on said rod or stem, a tube or pipe $g$ on said rod or stem to which said disk is secured, a series of receptacles on said top piece, each adapted to contain a gas-producing substance, a locking or holding means on said disk arranged to engage with said receptacles, one at a time, to empty their contents into the water-tank, consisting, of a tube $h$ rotatively arranged on said tube or pipe $g$, a ratchet mechanism on said tube or pipe $h$ for actuating the same, a spur or foot connected with said tube or pipe, and a series of pivoted posts or arms on said disk normally in holding engagement with said receptacles, a gas-receiver connected with said water-tank, a vertically-moving gas-holder in said gas-receiver, and an intermediate mechanism between said gas-holder and said ratchet mechanism, actuated by the rising and falling of said gas-holder, consisting, essentially, of a series of pivotally-connected arms or levers, all arranged, substantially as and for the purposes set forth.

In testimony that I claim the invention set forth above I have hereunto set my hand this 28th day of November, 1898.

FRITZ A. FELDKAMP.

Witnesses:
FREDK C. FRAENTZEL,
WALTER H. TALMAGE.